United States Patent
Schweitzer et al.

(10) Patent No.: US 7,082,755 B2
(45) Date of Patent: Aug. 1, 2006

(54) TORQUE CONVERTER WITH A THIN TORUS TURBINE

(75) Inventors: Jean M. Schweitzer, Ypsilanti, MI (US); Jeya Gandham, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 222 days.

(21) Appl. No.: 10/765,690

(22) Filed: Jan. 26, 2004

(65) Prior Publication Data

US 2005/0160725 A1 Jul. 28, 2005

(51) Int. Cl.
*F16D 33/20* (2006.01)

(52) U.S. Cl. .......................................... 60/365; 60/367
(58) Field of Classification Search .................. 60/364, 60/365, 366, 367
See application file for complete search history.

(56) References Cited

U.S. PATENT DOCUMENTS 2,663,149 A * 12/1953 Zeidler et al. ................ 60/367
3,756,028 A * 9/1973 Bopp et al. ................... 60/366

* cited by examiner

*Primary Examiner*—F. Daniel Lopez
(74) *Attorney, Agent, or Firm*—Christopher DeVries

(57) ABSTRACT

A torque converter includes an impeller and a turbine. The impeller has a substantially constant flow area from a radially inward inlet to a radially outward outlet through a toroidal path. The torque converter turbine has an inlet flow area substantially equal to the impeller outlet flow area and an outlet flow area substantially equal to the impeller inlet flow area. The flow area of the turbine along a toroidal path decreases in size from the turbine inlet to a point substantially midway through the flow path from which point the flow area increases so that the outlet flow area is substantially equal to the inlet flow area.

1 Claim, 2 Drawing Sheets

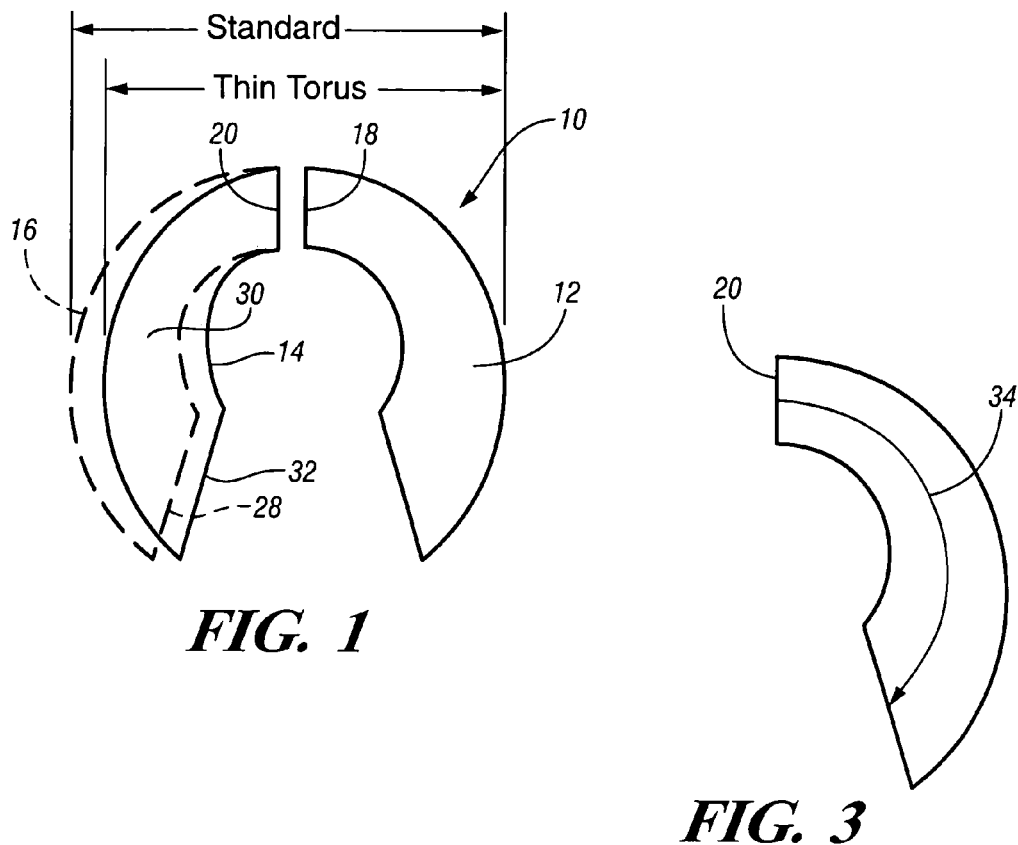
FIG. 1
FIG. 3
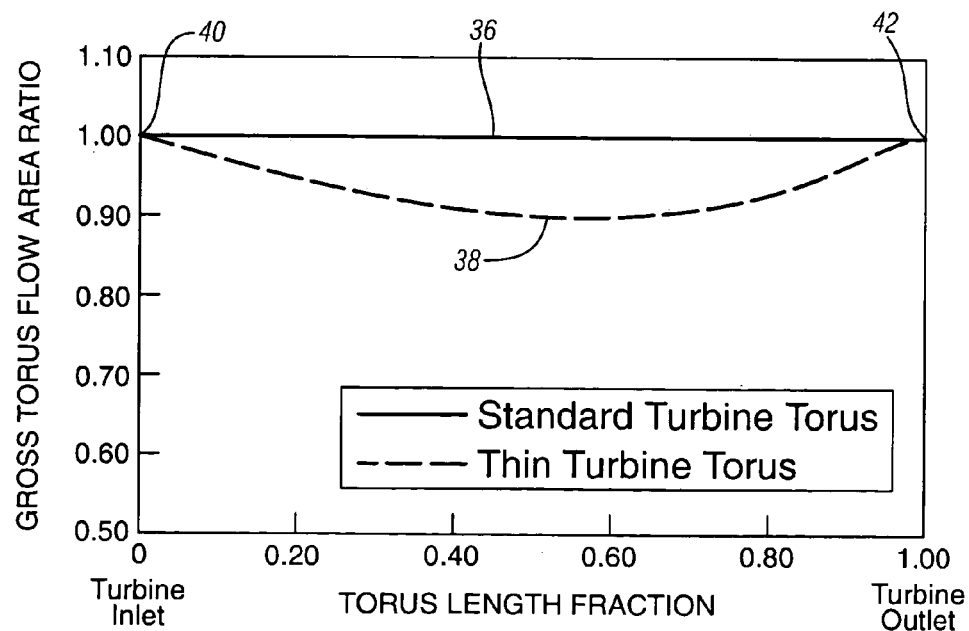
FIG. 2

US 7,082,755 B2

TORQUE CONVERTER WITH A THIN TORUS TURBINE

TECHNICAL FIELD

This invention relates to hydrodynamic drive mechanisms and, more particularly, to torque converter assemblies including an impeller and a turbine.

BACKGROUND OF THE INVENTION

Current automatic power transmissions generally include a hydrodynamic input device such as a torque converter or fluid coupler. The torque converter is employed mainly to provide torque multiplication in the lower speed range. The torque converter consists of an engine-driven impeller, a fluid turbine, and a fluid stator. The impeller driven by the engine accelerates fluid for passage to the turbine. The turbine converts the fluid energy coming from the impeller into mechanical energy, which is transmitted to the input shaft of a transmission.

The stator mechanism disposed between the fluid inlet of the impeller and the fluid outlet of the turbine redirects the fluid from the turbine to the impeller thereby improving the flow efficiency and increasing the torque multiplication of the hydrodynamic torque converter. The fluid passes from the inner torus section of the impeller substantially radially outward in a toric path and then through the path in the turbine in a substantially toric path back to the stator. The flow areas in the impeller and turbine are substantially constant throughout the torus flow area or for the torus flow length. In constant area turbine assemblies, the flow therein can encounter energy loss when a reversal or separation in flow occurs near the center of the flow path adjacent the inner side wall of the torus. This flow inconsistency reduces the efficiency of the torque converter.

SUMMARY OF THE INVENTION

It is an object of the present invention to provide an improved torque converter having an impeller and a turbine.

In one aspect of the present invention, the turbine has a thin torus shape compared with the impeller.

In another aspect of the present invention, the turbine has a plurality of blades, which cooperate with inner and outer shells to form a plurality of flow paths within the turbine.

In yet another aspect of the present invention, the flow paths through the turbine have an inlet area substantially equal to the outlet area of the impeller and an outlet area substantially equal to the inlet area of the impeller and a continuously changing area between the turbine inlet and the turbine outlet.

In yet still another aspect of the present invention, the flow area through the turbine decreases in area from the driven inlet to substantially the center of the flow path and then increases in area back to the original or the inlet area size.

DESCRIPTION OF THE DRAWINGS

FIG. 1 is a diagrammatic representation of a torque converter turbine incorporating the present invention as compared with a torque converter turbine of a standard unit.

FIG. 2 is a curve of turbine flow area ratio versus torus length fraction.

FIG. 3 is a diagrammatic representation of a portion of a torus describing the torus flow length path.

DESCRIPTION OF AN EXEMPLARY EMBODIMENT

Figure 4:
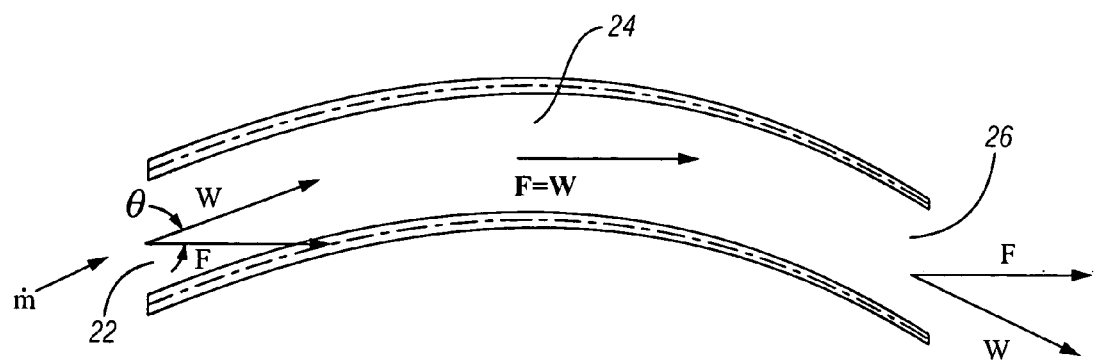
FIG. 4 is a diagrammatic representation of fluid flow through a torque converter turbine between consecutive blades.

Referring to the drawings, there is seen in FIG. 1 a diagrammatic representation of a torque converter 10 including a torque converter impeller or pump 12, and a torque converter turbine or thin torus turbine 14. The stator of the torque converter has been eliminated from the drawing for clarity. Also shown in FIG. 1 in dashed lines is a torque converter turbine 16, which is a conventional or the standard torque converter torus. The thin torus turbine 14 reduces the overall width of the torque converter 10 thereby reducing the overall length requirement for a transmission in which the thin torus turbine is employed.

As seen in FIG. 4, the torque converter turbine 14 has a plurality of spaced blades to which flow from the torque converter impeller 12 is delivered. The torque converter impeller 12 has an outlet area 18, and the torque converter turbine 14 has an inlet area 20, which is equal to the area 18. This is represented at 22 in FIG. 4.

As seen, the flow into the turbine may be divided into a toroidal velocity F and a relative velocity W. These two velocities are related or proportional to each other through a function of the cosine of the angle θ. As the flow passes between the blades of the turbine, the relative velocity and toroidal velocity coincide essentially at a midpoint 24 and are separated by the angle θ at the outlet 26.

The conventional or standard turbine 16 has a constant flow area from the inlet 20 to the turbine outlet 28 while the turbine torus 14 has an area at inlet 20 equal to the area of 18 and decreases in area to approximately at midpoint 30 and thereafter increases in area size toward an outlet 32. This change in area is represented in FIG. 2. On the one axis is represented the gross flow area ratio and on the other is the torus length fraction. The gross torus flow area ratio is representative of the area at a specific design point along the torus flow length divided by the area at the torus inlet. The torus flow length about which the torus length fraction is calculated is represented by the line 34 in FIG. 3.

In FIG. 2 it can be seen that the gross torus flow area ratio versus torus length fraction for a conventional or standard torque converter represented by the line 36 is constant; that is, the gross flow area is one for the entire length of the torus flow. As seen at line 38 in FIG. 2, the gross torus flow area ratio decreases from the inlet at point 40 to the approximate center of the torus length fraction and then increases to the torus outlet 42. This change in gross flow area ratio reduces or eliminates the energy losses which otherwise might occur within the turbine flow path.

FIG. 4, as previously stated, defines the toroidal flow velocity versus relative velocity through the torque converter turbine path. If small leakages along the path are ignored, the mass flow rate m through the passage is constant. The toroidal velocity F is also constant. The relative velocity W in a direction tangent to the blade is proportional, as previously stated, to the toroidal velocity F as represented by the cosine of the angle θ. At the central flow area 24, the two velocities are equal indicating that the velocity W has decreased relative to the toroidal velocity F and then increases relative to the flow toroidal velocity F as the fluid passes to the outlet 26. Also, the velocity W is flowing into a region of increasing pressure as the fluid flows from the inlet 22 to the central flow area 24.

Under these conditions, flow separation and flow reversal can occur at approximately the midpoint of the torque converter turbine flow path. The present invention establishes a flow path in which the relative velocity W is more uniform with relationship to the toroidal velocity F because of the reduction in the flow area toward the center of the flow path.

Figure 5:
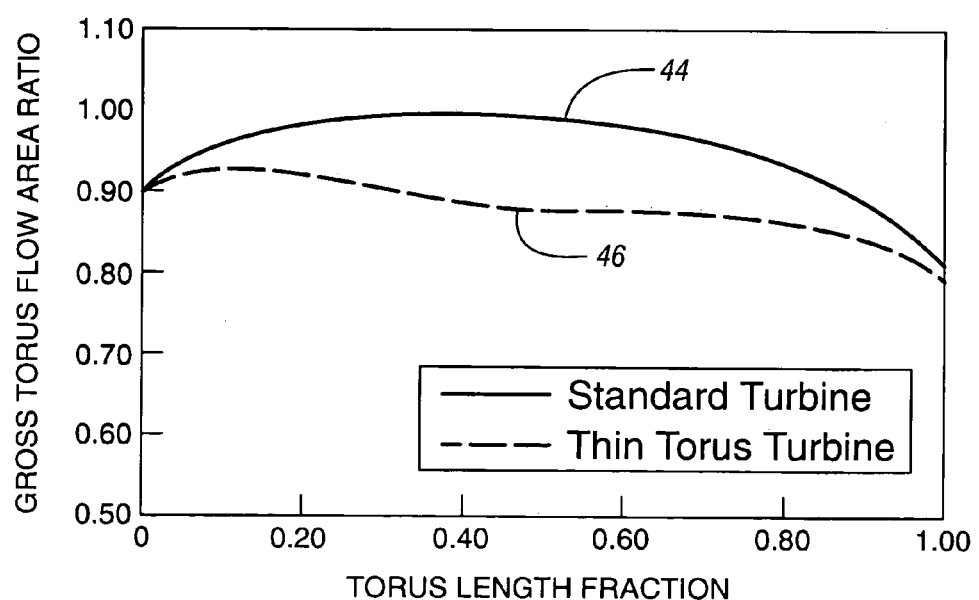
FIG. 5 is a curve representing the effective flow area of both a conventional turbine and a turbine incorporating the present invention versus the torus length fraction.

FIG. 5 represents the effective flow area for both a standard turbine flow path 44 and a thin torus flow path 46. The thin torus turbine with a nonuniform gross flow area for the torus has a more uniform effective flow area for the turbine assembly. This improves the operation of the torque converter.

The torus length fraction of FIG. 5 and the torus length fraction of FIG. 4 are identical in number and they represent the position through the torus flow area along the torus length 34 as seen in FIG. 3. For example, a torus length fraction of 0.2 represents a point along the torus length 34, twenty percent inward from the turbine inlet 20.

The invention claimed is:

1. A torque converter comprising:
an impeller having a predetermined flow paths for directing fluid from a radially inward position to a radially position through a toroidal path;
a torque converter turbine having flow paths for directing fluid from the impeller through a substantially toroidal flow path radially inward, said flow paths in said torque converter turbine each having a first area at an inlet thereof, a second area at an outlet thereof, a decreasing flow area between said inlet and said outlet to a predetermined point having a third area along the flow path, and an increase in flow area from said predetermined point to said second area;
said second area being equal to said first area.

* * * * *